(12) United States Patent
Peek et al.

(10) Patent No.: US 6,307,764 B1
(45) Date of Patent: Oct. 23, 2001

(54) POWER BRICK

(75) Inventors: Gregory A. Peek, Hillsboro; Jonathan C. Leuker, Portland; Steven D. Kassel, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/019,145

(22) Filed: Feb. 5, 1998

(51) Int. Cl.$^7$ ................................................. H02M 7/00
(52) U.S. Cl. ............................................................ 363/125
(58) Field of Search .............................. 363/44, 52, 53, 363/84, 123, 125

(56) References Cited

U.S. PATENT DOCUMENTS

| | | | |
|---|---|---|---|
| 4,638,178 | * 1/1987 | Kayser | 307/85 |
| 4,943,888 | * 7/1990 | Jacob et al. | 361/96 |
| 5,640,312 | * 6/1997 | Carroll | 363/21 |
| 5,642,412 | * 6/1997 | Reymond | 379/348 |
| 5,729,421 | * 3/1998 | Gershen et al. | 361/113 |
| 6,130,896 | 10/2000 | Lueker et al. . | |

OTHER PUBLICATIONS

U.S. application No. 08/594,383, Lueker et al., filed Oct. 20, 1997.

Adaptive Networks, Inc., Newton, MA 02159, Product List, 1996.

http://www.adaptivenetworks.com/HTM/products.htm, Feb. 4, 1998, pp. 1–3.

* cited by examiner

*Primary Examiner*—Matthew Nguyen
(74) *Attorney, Agent, or Firm*—Howard A. Skaist

(57) ABSTRACT

Briefly, in accordance with one embodiment of the invention, a power brick for use with a network adapter includes: a power supply and at least one signal transformer. The power supply and the signal transformer are physically remote from the network adapter and capable of being electronically coupled to the network adapter via a cable. Briefly, in accordance with another embodiment of the invention, a power brick for use with a network adapter includes: at least two signal transformers. The at least two signal transformers are physically remote from the network adapter and capable of being electronically coupled to the network adapter via a cable. Briefly, in accordance with on more embodiment of the invention, a method of using a power brick with a network adapter includes the following. A high voltage power supply including superpositioned high frequency communications signals is received via a power brick. The voltage of the received signal is reduced. The reduced voltage is transmitted to the network adapter via a cable.

6 Claims, 2 Drawing Sheets

POWER BRICK

BACKGROUND

1. Field

The present invention relates to a network adapters and, more particularly, to network signaling through a power brick.

2. Background Information

Due at least in part to the electrical coupling between remote locations, such as homes and businesses, via power lines, it may be desirable to use such power lines to also transmit communication signals. For example, a local area network (LAN) or other type of computer network may communicate via such power lines. One difficulty, however, of employing this approach relates to accommodating circuitry for sending and receiving signals via these power lines, while also using the power lines as a power source. Adaptive Networks of Newton, Mass., for example, employs a network adapter housing and a conventional power cord or cable that couples the adapter housing to a wall outlet. Adaptive Networks has a website on the World Wide Web at the URL, http://www.adaptivenetworks.com/. Within this network adapter housing is incorporated a direct current (DC) power supply and capacitor/transformer circuitry to transmit and receive communications signals via the power lines. Due, at least in part, to the unusual use of the power lines as a communications medium, a need exists for an apparatus or configuration that efficiently and effectively addresses the complexities of combining electrical circuitry to accomplish these multiple goals.

SUMMARY

Briefly, in accordance with one embodiment of the invention, a power brick for use with a network adapter includes: a power supply and at least one signal transformer. The power supply and the at least one signal transformer are physically remote from the network adapter and capable of being electronically coupled to the network adapter via a cable.

Briefly, in accordance with another embodiment of the invention, a power brick for use with a network adapter includes: at least two signal transformers. The at least two signal transformers are physically remote from the network adapter and capable of being electronically coupled to the network adapter via a cable.

Briefly, in accordance with one more embodiment of the invention, a method of using a power brick with a network adapter includes the following. A high voltage power signal including superpositioned high frequency communications signals is received via a power brick. The voltage of the received signal is reduced. The reduced voltage signal is transmitted to the network adapter via a cable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously indicated, in some instances it may be desirable to transmit communication signals using power lines. In one approach, these communication signals are superimposed upon or superpositioned with the alternating current (AC) high voltage signals transmitted via the power line. Thus, special circuitry is employed to transfer signals and receive signals via the power lines that are also employed to transmit power. By employing the power lines in this manner, it may be possible to have a local area network (LAN) or other type of computer network in which the computers are mutually coupled and communicating using these power lines. Of course, as is well-known, typically personal computers (PCs) operate using relatively low voltage direct current (DC) power sources, whereas power lines typically act as a source for high voltage alternating current (AC) power signals. Therefore, complexities may arise in accommodating the electrical circuitry to address both the low voltage direct current (DC) needs of a personal computer, while also accommodating the high voltage alternating current (AC) power delivered via the power lines. In one approach, a company, Adaptive Networks, provides a network adapter housing that incorporates both a low power DC power supply and capacitor/transformer circuitry used to transmit and receive high frequency signals via the power lines. Although such an approach may provide satisfactory operation, it does have disadvantages. For example, the network adapter housing is enlarged to provide adequate physical space for the additional electrical circuitry, in comparison with typical network adapters for PCs. Likewise, to provide the high voltage alternating current (AC) power from the wall outlet to the adapter housing, a conventional power cord several feet in length is employed and routed adjacent to the networked (low power) PC. Aside from being bulky, this approach may be disadvantageous from a safety standpoint due to the presence of the high voltage alternating current (AC) signal and may therefore make it difficult to obtain safety certification for such an arrangement.

Figure 1:
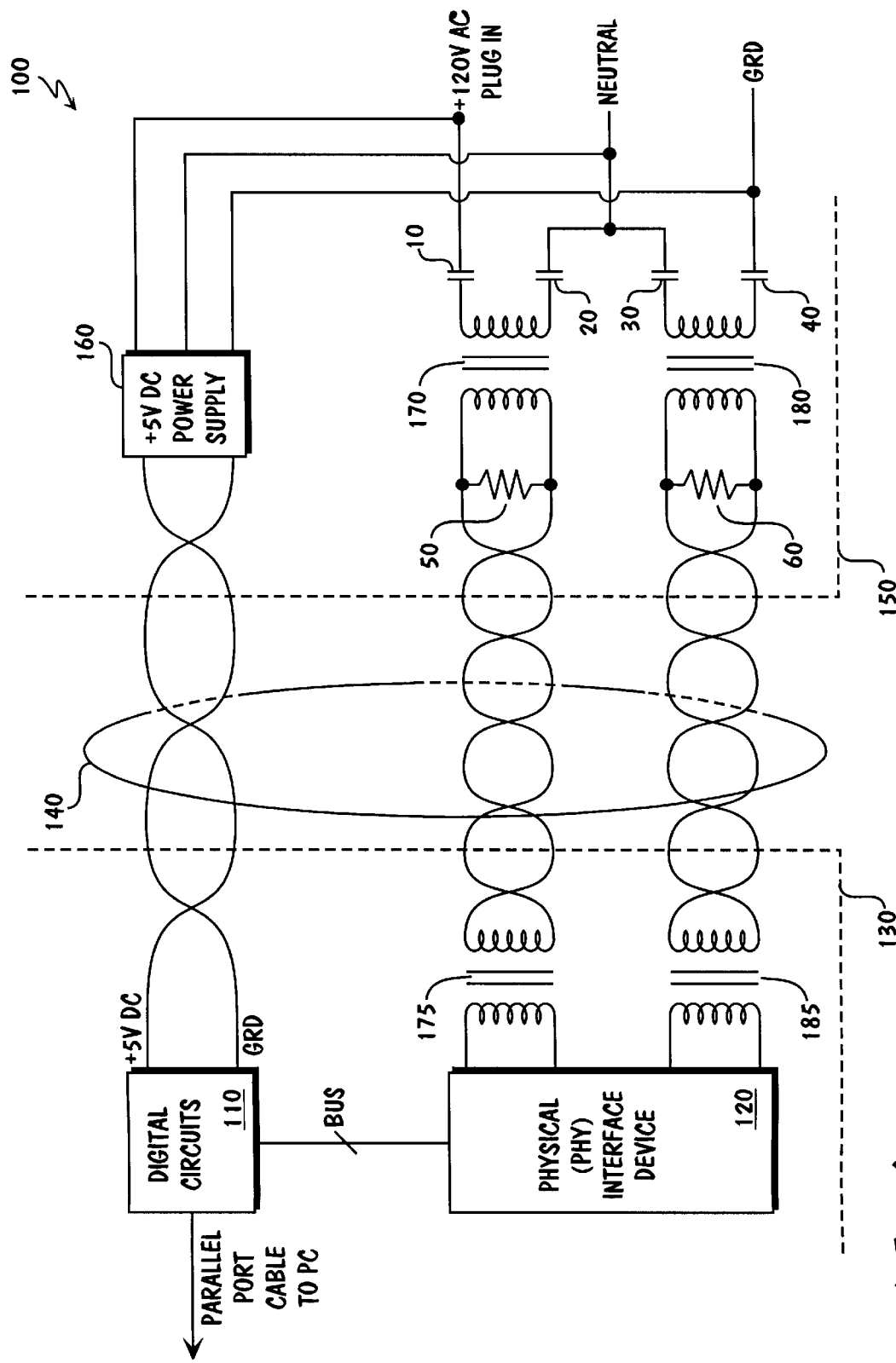
FIG. 1 is a schematic diagram illustrating an embodiment of a power brick in accordance with the present invention.

FIG. 1 is a schematic diagram illustrating an embodiment 150 of a power brick for use with a network adapter, such as adapter 130 illustrated also in FIG. 1. In this context, the term power brick refers to an enclosure containing an AC-to-DC power supply converter. Brick 150 and adapter 130, coupled via cable 140, comprise an embodiment of a system for coupling a PC to a network using power lines. As illustrated, in this particular embodiment, brick 150 includes power supply 160, signal transformer 170 and signal transformer 180. Also included in this embodiment are capacitors 10, 20, 30 and 40 and resistors 50 and 60. As illustrated, DC power supply 160 is coupled to the power lines to receive AC power via three couplings. In this embodiment, one coupling is coupled to electrical ground, one coupling is coupled to neutral, and one coupling is coupled to the alternating current (AC) plug line, which in this particular embodiment, provides 120 volts AC. Likewise, in this particular embodiment, power supply 160 converts the 120 volts AC to 5 volts DC, although, of course, the invention is not limited in scope to these particular AC and DC voltage levels. In this particular embodiment, DC power supply 160 provides five volts DC to power circuitry 110. Also, in this particular embodiment, circuitry 110 is coupled to a parallel port of a personal computer via a cable. Therefore, circuitry 110 receives the digital signals from physical interface device 120 that have been produced based, at least in part, on the analog signals received via the power lines. Circuitry 110 produces digital signals in an appropriate format for communication with the PC. Likewise, digital signals are received from the PC in this format and converted to digital signals to which physical interface device 120 will respond so that analog signals, based, at least in part, on the digital signals applied to device 120, are transmitted via the power lines. Of course, in an alternative embodiment, the PC may couple to the network adapter through a serial port instead of a parallel port.

As FIG. 1 illustrates, in this embodiment, circuitry to the left of cable 140 comprises low voltage circuitry, whereas high voltage circuitry is provided to the right of cable 140. More specifically, as previously described, circuitry 110 operates using 5 volts DC power in this embodiment. Likewise, physical interface device 120 comprises a low voltage device and receives signals that have been electromagnetically induced by at least one of transformers 170 and 180 in this embodiment. These low voltage signals are transmitted to and from physical interface device 120 via at least one of two twisted pairs of wires included in cable 140, in this particular embodiment. This embodiment includes additional transformers 175 and 185 to improve signal quality, although these may be omitted in other embodiments. These low voltage signals are then superimposed on the power lines or superpositioned with the power signals by at least one of the transformers in brick 150, again through electromagnetic induction. Further, high frequency signals received via the power lines induce electromagnetic signals to be communicated to physical interface device 120 via at least one of two twisted pairs of wires in cable 140, in this embodiment. As illustrated, capacitors 10 through 40 are employed to filter out direct current (DC) or low frequency components and shunt resistors 50 and 60 are included to match the impedance of one cable and, thereby, improve signal quality on the twisted pair wires.

An advantage, then, of this particular approach is that the high voltage circuitry employed for communicating high frequency signals via the power line and for providing power are physically removed from or physically remote from the network adapter which, in this particular embodiment, only includes low voltage circuitry. Therefore, this approach is both safe, from a PC user perspective, by physically isolating the high voltage circuitry and, likewise, as a result, is easier to certify for safety (e.g., Underwriters Laboratory). In addition, a housing for the network adapter may employ standard housing, thereby reducing or eliminating the need to manufacture special components for this networking approach, other than manufacture of the power brick itself. This may reduce manufacturing costs. Furthermore, cable 140, which comprises twisted pairs of wires, is both safer and more desirable than a conventional power cord.

Figure 2:
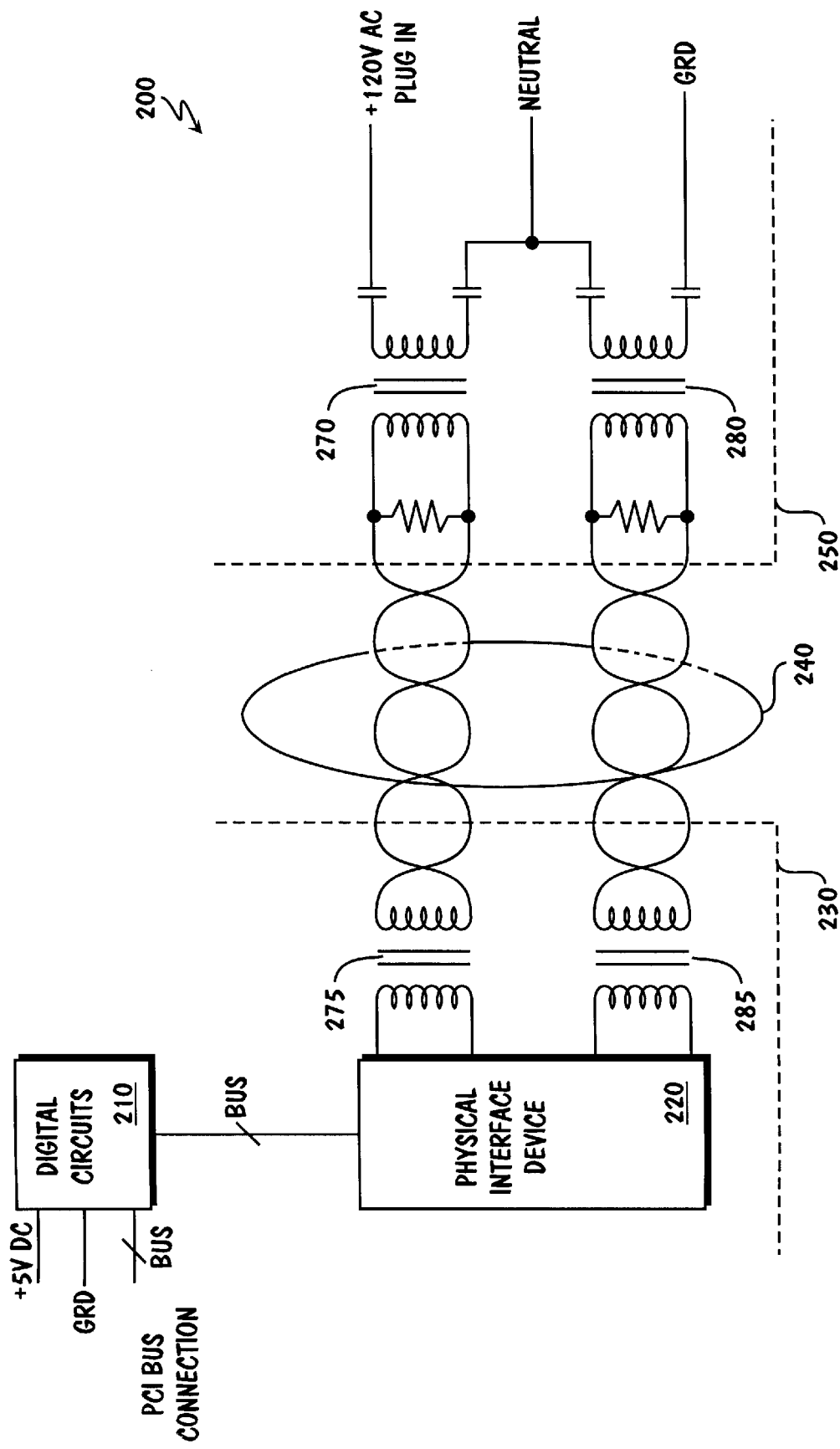
FIG. 2 is a schematic diagram illustrating another embodiment of a power brick in accordance with the present invention.

FIG. 2 is a schematic diagram illustrating another embodiment 250 of a power brick, as well as an embodiment 230 of a network adapter and another embodiment 240 of a cable comprising twisted pairs. Although similar to the embodiment illustrated in FIG. 1, this particular embodiment provides an advantage in that this power brick employs less circuitry than the embodiment of FIG. 1. As shown, a DC power supply is not provided. Nonetheless, this particular embodiment provides similar advantages to the embodiment of FIG. 1, such as: separating high voltage and low voltage circuitry physically, being relatively easy to manufacture, and providing improved safety, ease of safety certification, and simplification of the coupling cable. In this particular embodiment, circuitry, such as 210 in FIG. 2, is powered via the PC itself, instead of from the power lines circuitry. Such an approach may be employed where signaling specifications, such as PCI or 1394, for example, are employed, which describe providing low voltage power to such circuits. Therefore, in this particular embodiment, although the invention is not limited in scope in this respect, a PCI specification compliant bus couples circuitry 210 to the PC. As a result, therefore, cable 240 comprises two twisted pairs, in comparison with cable 140 of FIG. 1, in which three are employed.

More information about the Peripheral Component Interconnect (PCI) Specification is available from PCI Special Interest Group, 2575 NE Kathryn St., #17, Hillsboro, OR 97124. More information about IEEE's 1394 Specification is available from the 1394 Trade Association having a website on the world wide web at URL http://firewire.org/ or from the IEEE at 445 Hoes Lane, Piscataway, N.J.

An embodiment of the method of using a power brick and a network adapter in accordance with the present invention, such as the embodiments of a power brick and a network adapter previously described, may include the following. A high voltage power signal including superpositioned high frequency communications signals may be received via a power brick, such as, for example, illustrated in FIG. 1, in which high voltage power signals are received by power brick. Within the power brick in the particular embodiment, the voltage of the received power signals is reduced. For example, as illustrated in FIG. 1, at least one of the two transformers 170 and 180 is employed with capacitors to reduce the voltage of the received signal by filtering the high voltage, low frequency component of the received signal. For example, in this embodiment, a 120 V, 50–60 Hz component is filtered out. Then, the reduced voltage signal is transmitted to the network adapter via a cable, such as in FIG. 1 via cable 140 to network adapter 130. As illustrated in FIG. 1, the cable, such as cable 140, may comprise a low voltage cable. Furthermore, in the network adapter, 130 in this particular embodiment, the high frequency communications signals that have been passed are then converted to digital signals, such as by physical interface device 120 in FIG. 1. The digital signals are then transmitted to a PC coupled to the network adapter. For example, as illustrated in FIG. 1, the digital signals are transmitted to digital circuits 110 for formatting and then transmitted via a parallel port cable to a PC. It will, of course, be appreciated that the invention is not limited in scope to this particular embodiment and many modifications and variations are possible. Likewise, as illustrated in FIG. 2, a PCI specification compliant bus connection to the PC may be employed. Of course, again, the invention is not limited in scope in this respect.

While certain features of the invention have been illustrated and describe herein, many modifications, substitutions, changes and equivalents, will now occur to those skilled in the art. It is, therefore, to be understood that the appended claims are intended to cover all such modifications and changes as fall within the true spirit of the invention.

What is claimed is:

1. A power brick for use with a network adapter comprising:

a power supply and at least two signal transformers;

said power supply and the at least two signal transformers being physically remote from said network adapter and being capable of being electronically coupled to said network adapter via a cable;

wherein said brick is adapted to be coupled to conventional power lines and wherein said power supply is adapted to convert AC power to DC power;

said at least two signal transformers being coupled in a configuration to send and receive high frequency communication signals via said conventional power lines; and said network adapter includes circuitry to format digital signals for communication with a PC via a cable coupling to a parallel port of the PC.

2. The power brick of claim 1, wherein said cables comprises low voltage cables.

3. A method of using a power brick with a network adapter comprising:

receiving via said power brick high voltage power signals including superpositioned high frequency communications signals;

reducing the voltage of the received signals;

transmitting the reduced voltage signals to the network adapter via a low voltage cable;

converting the high frequency communication signals to a digital signal; and transmitting the digital signals to a PC coupled to said network adapter.

4. The method of claim 3, wherein said cable comprises a low voltage cable.

5. A power brick for use with a network adapter comprising:

at least two signal transformers;

said at least two signal transformers being physically remote from said network adapter and being capable of being electronically coupled to said network adapter via a cable;

said brick being adapted to be coupled to conventional power lines;

said at least two signal transformers are coupled in a configuration to send a receive high frequency communication signals via said conventional power lines; and said network adapter includes circuitry to format digital signals for communication with a PC via a cable coupling to a parallel port of the PC.

6. The power brick of claim 5, wherein said cable comprises a low-voltage cable.

* * * * *